United States Patent [19]
Kijima

[11] Patent Number: 5,282,120
[45] Date of Patent: Jan. 25, 1994

[54] CONVERTER FOR PROVIDING BOOST VOLTAGE FOR A FLASH DISCHARGE LAMP SERVING AS A PHOTOGRAPHIC LIGHT

[75] Inventor: Seiichi Kijima, Tokyo, Japan

[73] Assignee: Kijima Co., Ltd., Tokyo, Japan

[21] Appl. No.: 848,844

[22] Filed: Mar. 10, 1992

[30] Foreign Application Priority Data

Mar. 19, 1991 [JP] Japan ............................ 2-78194

[51] Int. Cl.⁵ .......................................... H02M 3/335
[52] U.S. Cl. ............................ 363/21; 323/358;
323/362; 354/145.1; 315/219; 315/241 R
[58] Field of Search .............. 363/20, 21; 323/267,
323/362, 358, 359; 354/145.1; 315/209 R, 219,
238, 241

[56] References Cited

U.S. PATENT DOCUMENTS 4,999,759  3/1991  Cavagnolo et al. .................. 363/21

Primary Examiner—Emanuel T. Voeltz
Attorney, Agent, or Firm—Spensley Horn Jubas & Lubitz

[57] ABSTRACT

The present invention has an object to develop a converter allowing dielectric strength of a booster transformer to be reduced by half for miniaturization and security thereof. To achieve this object, the booster transformer is provided with first and second secondary coils so that, every time a switching element is turned ON, the first secondary coil generates positive voltage in reference with the negative terminal potential of a DC source while the second secondary coil generates negative voltage also in reference with the negative terminal potential of the DC source and a sum of these positive and negative voltages is output from the converter as a composite voltage.

4 Claims, 5 Drawing Sheets

CONVERTER FOR PROVIDING BOOST VOLTAGE FOR A FLASH DISCHARGE LAMP SERVING AS A PHOTOGRAPHIC LIGHT

BACKGROUND OF THE INVENTION 1. (Field of the Invention)

The present invention relates to a converter adapted to be applied with DC voltage and to provide the boosted output voltage, which is used, for example, with a flash discharge lamp serving as photographic lighting means.

2. (Background Art)

FIG. 6 is a circuit diagram of the conventional photoflash discharge lamp.

This photoflash discharge lamp utilizes a converter including a booster transformer 11 and a switching transistor 12 to boost DC voltage supplied from a battery source 13 and to charge a main capacitor 14 with this boosted voltage.

More specifically, upon closure of a source switch 15, the battery source current flows through emitter-base of the transistor 12 and a resistor 16, thus turning the transistor 12 ON. A capacitor 18 serves to stabilize operation.

The battery current flows through a primary coil 11P of the booster transformer 11 and boosted voltage is generated across a secondary coil 11S.

This boosted voltage is applied to the main capacitor 14 via a diode 17 and thus the main capacitor 14 is charged.

In the course of this charging, the transistor 12 causes the primary coil current to be rapidly increased under a positive feedback effect by a charging circuit comprising the secondary coil 11S, the diode 17, the main capacitor 14 and the emitter-base of the transistor 12

When the primary coil current increases up to a predetermined level depending on the internal resistance of the transistor 12 and the battery source 13, the transistor 12 is turned OFF.

The above-mentioned operation is repeated at first-half stage of charging of the main capacitor 14 and the booster transformer 11 is magnetically saturated before the primary coil current increases up to said predetermined level, since the secondary coil current decreases as the charging of the main capacitor 14 progresses.

Consequently, the transistor 12 is turned OFF due to said magnetic saturation and such operation is repeated until the main capacitor 14 is charged to a predetermined voltage value.

The photoflash discharge lamp circuit includes a trigger circuitry comprising a trigger switch 19, a trigger capacitor 20 and a trigger transformer 21 and, upon closure of the trigger switch 19, a flash discharge tube 22 is applied with excitation voltage.

The flash discharge tube 22 thus excited discharges the main capacitor 14 for light emission.

The booster transformer 11 as the important component of the converter in this photoflash discharge lamp circuit comprises the primary coil 11P and the secondary coil 11S lap wound one on another.

For example, after the secondary coil 11S has been wound by several thousand turns on a flanged bobbin, the primary coil 11P is wound by several ten turns on the outer periphery of the secondary coil 11S. The bobbin on which the coils have been wound is provided with a E-E-shaped or E-I-shaped ferrite core to form a desired small sized transformer.

In view of a fact that the demand for miniaturization of the booster transformer grows day by day, various attempts have already be made to meet such demand, for example, by reducing a bobbin thickness or modifying a configuration of the ferrite core.

However, with the booster transformer of this type, the output voltage usually reaches 300 to 400 volts or higher and the counter electromotive force generated in the secondary coil 11S as the state of the transistor 12 changes from ON to OFF sometimes reaches 1500 volts or higher. With a consequence, excessively reduced bobbin thickness has often caused leak accident between the primary and secondary coils and/or between a low voltage portion and a high voltage portion of the secondary coil.

On the other hand, the configurational modification of the ferrite core is necessarily limited by a predetermined quantity of iron required for the proper function of the core.

SUMMARY OF THE INVENTION

In view of the situation as has been mentioned above, it is a principal object of the invention to develop a converter allowing a dielectric strength of the booster transformer of above-mentioned type to be safely reduced by half and thereby allowing the booster transformer to be effectively miniaturized.

The object set forth above is achieved, in accordance with the invention, by a converter including a booster transformer and a switching element adapted for make and break of a primary coil current of said booster transformer so that voltage of a DC source feeding said primary coil current may be boosted by and output from the converter, characterized in that the booster transformer has a first secondary coil generating positive voltage in reference with zero potential every time the primary coil current flows and a second secondary coil generating negative voltage also in reference with said zero potential so that the voltage corresponding to a sum of the positive voltage generated across the first secondary coil and the negative voltage generated across the second secondary coil may be output from between these first and second secondary coils.

With this converter, every time the switching element is turned ON, the positive voltage is generated across the first secondary coil and simultaneously the negative voltage is generated across the second secondary coil of the booster transformer.

Specifically, the first secondary coil generates the positive voltage and the second secondary coil generates the negative voltage both in reference with the negative terminal potential (zero volt) of the DC source. Accordingly, the sum of the positive voltage generated across the first secondary coil and the negative voltage generated across the second secondary coil corresponds to the composite output voltage of the converter.

The booster transformer constituting such converter may be insulated merely with respect to the counter electromotive force generated in the first and second secondary coils, respectively, so the insulating means can be correspondingly simplified advantageously for miniaturization as well as safety of the booster transformer.

DESCRIPTION OF THE PREFERRED EMBODIMENT

The invention will be more readily understood from the following description of a preferred embodiment made in reference with the attached drawings.

Figure 1:
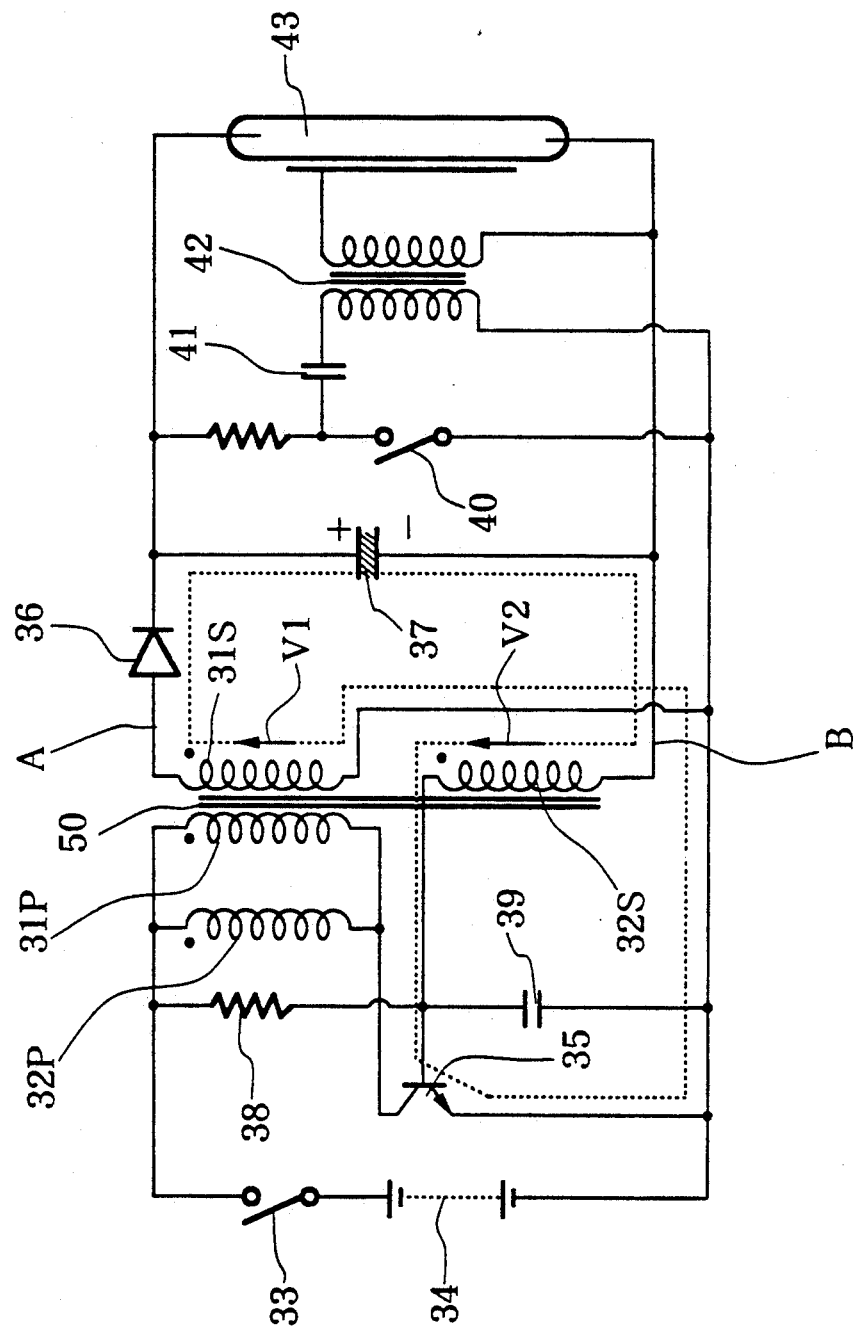
FIG. 1 is a circuit diagram of the photoflash discharge lamp provided with the converter of the invention.

Referring to FIG. 1, there is shown a photoflash discharge lamp circuit provided with a converter of the invention.

A booster transformer 50 of this converter has a first primary coil 31P, a second primary coil 32P, a first secondary coil 31S and a second secondary coil 32S.

The first and second primary coils 31P, 32P are connected in parallel to each other and this parallel connection has one end connected to a positive terminal of a battery source 34 via a source switch 33 and the other end connected to collector of a switching transistor 35.

The first secondary coil 31S has one end connected to the positive voltage side of a main capacitor 37 via a diode 36 and the other end connected to a negative terminal of the battery source 34.

The second secondary coil 32S has one end connected to the negative terminal of the battery source 34 via base-emitter of the transistor 35 and the other end connected to the negative voltage side of the main capacitor 37.

The other components are similar to those in the well known art, i.e., the circuit includes a starting resistor 38, a stabilizing capacitor 39, a trigger switch 40, a trigger capacitor 41, a trigger transformer 42 and a flash discharge tube 43.

In the photoflash discharge lamp circuit as mentioned above, upon closure of the source switch 33, the battery source current flows through the starting resistor 38 into the base of the transistor 35, turning this transistor 35 ON.

When the transistor 35 is thus turned ON, the current flows from the battery source 34 into the primary coils 31P, 32P and thereby output voltages V1, V2 are generated in directions as indicated by arrows, respectively, across the first and second secondary coils 31S, 32S, respectively. In a consequence, the main capacitor 37 is charged with a composite output voltage $|V1|+|V2|=|V0|$.

In the course of this charging, there is established a charging circuit, as indicated by a broken line, comprising the first secondary coil 31S, the diode 36, the main capacitor 37, the second secondary coil 32S and the base-emitter of the transistor 35, and the transistor 35 further increases the primary coil current under a feedback effect.

When the primary coil current reaches a predetermined level depending on internal resistance of the battery source 34 and the transistor 35, the transistor 35 is turned OFF. As a result, the output voltages V1, V2 disappear and a backward voltage (counter electromotive force voltage) is temporarily generated across the secondary coils 31S, 32S. Any current flowing due to this backward voltage is held back by the diode 36.

When the transistor 35 is turned ON again, the transistor 35 is applied again with the base current from the starting resistor 38 and the main capacitor 37 is charged in the same manner as has been described above.

While the main capacitor 37 is charged every time the transistor 35 is repeatedly turned ON, once the main capacitor 37 has been charged to a certain level, the booster transformer 50 is magnetically saturated and thus the transistor 35 is turned OFF before the primary coil current increases up to a predetermined level, because the secondary coil current decreases as charging of the main capacitor 37 progresses.

Every time the transistor 35 is turned OFF, the starting resistor 38 supplies the transistor 35 with the base current and turns it ON, thus charges the main capacitor 37 in the same manner as has been described above.

In the converter serving for such charging operation, the first secondary coil 31S of the booster transformer 50 generates a positive voltage in reference with the negative terminal potential (zero volt) of the battery source 34 and the second secondary coil 32S generates a negative voltage also in reference with the negative terminal potential.

In other words, the positive output voltage V1 is generated at an output A and the negative output voltage V2 is generated at an output B.

It should be understood that, though the transistor 35 is necessarily accompanied with a voltage drop due to the base-emitter resistance, such drop is substantially negligible and the output voltage V2 is generated as a negative voltage in reference with the negative terminal potential (zero volt) of the battery source 34.

Consequently, the output voltage (+V1) appearing at the output A and the output voltage (−V2) appearing at the output B are applied together to the main capacitor 37 which is thus charged with the composite voltage $|V1|+|V2|=|V0|$.

With such converter, the booster transformer 50 is adapted to generate the composite output voltage V0 in the form of divided output voltage V1, V2 and, therefore, the counter electromotive force voltage generated in this transformer is also correspondingly halved. In this manner, the dielectric strength of the first and second secondary coils 31S, 32S are reduced by half advantageously for simplified insulation.

When the main capacitor 37 is charged, for example, to 330 volts, there may be provided the first and second secondary coils 31S, 32S being capable of generating the positive output voltage V1 in the order of 165 to 175 volts and the negative output voltage V2 in the order of 165 to 175 volts, respectively. The counter electromotive force voltage generated in each of these secondary coils 31S, 32S is as low as in the order of 750 volts, i.e., the dielectric strength thereof is thus reduced by half.

Figure 2:
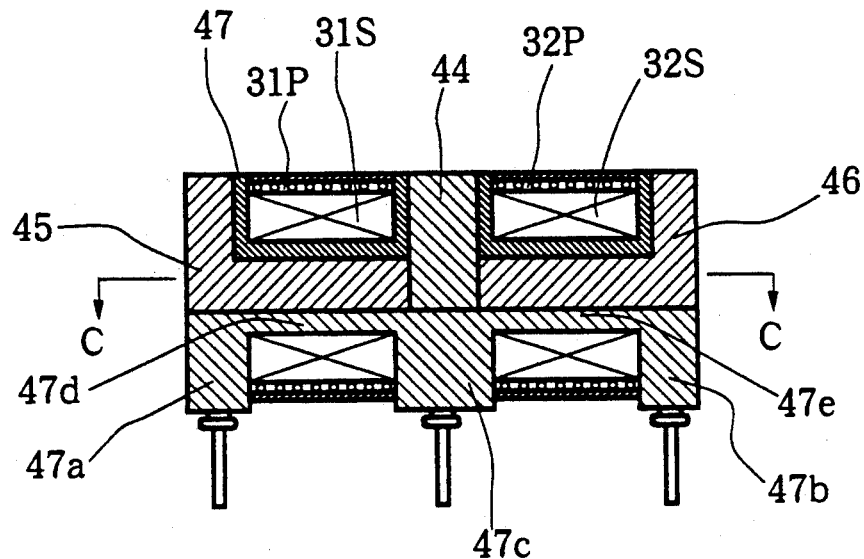
FIG. 2 is an axial sectional view of the booster transformer used in said converter.
Figure 3:
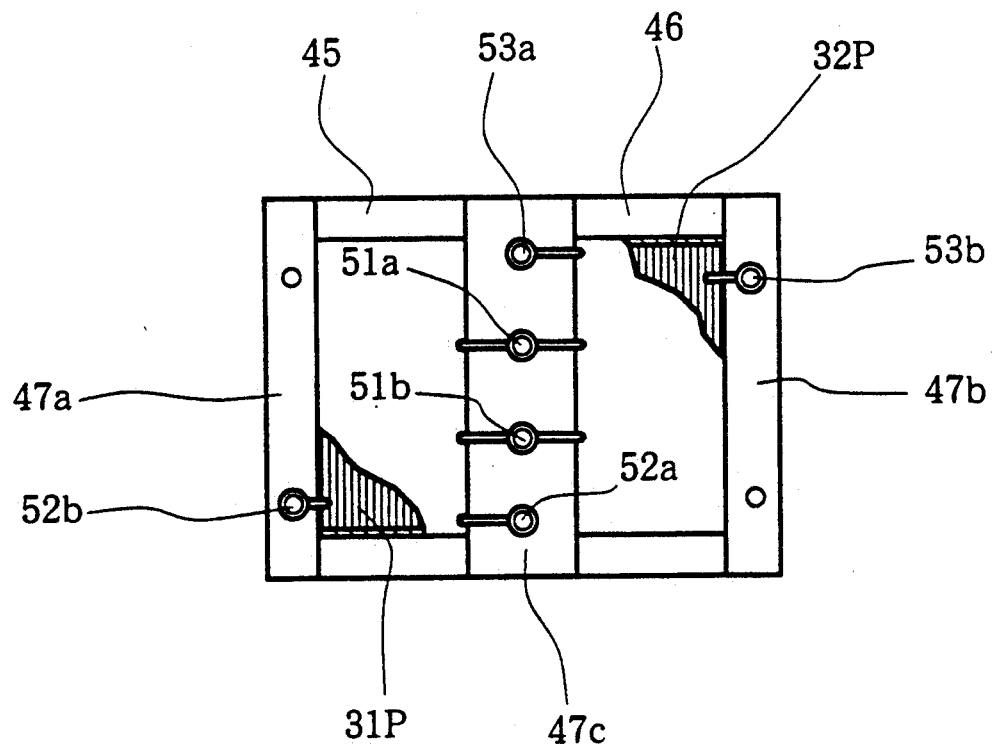
FIG. 3 is a bottom view of said booster transformer.
Figure 4:
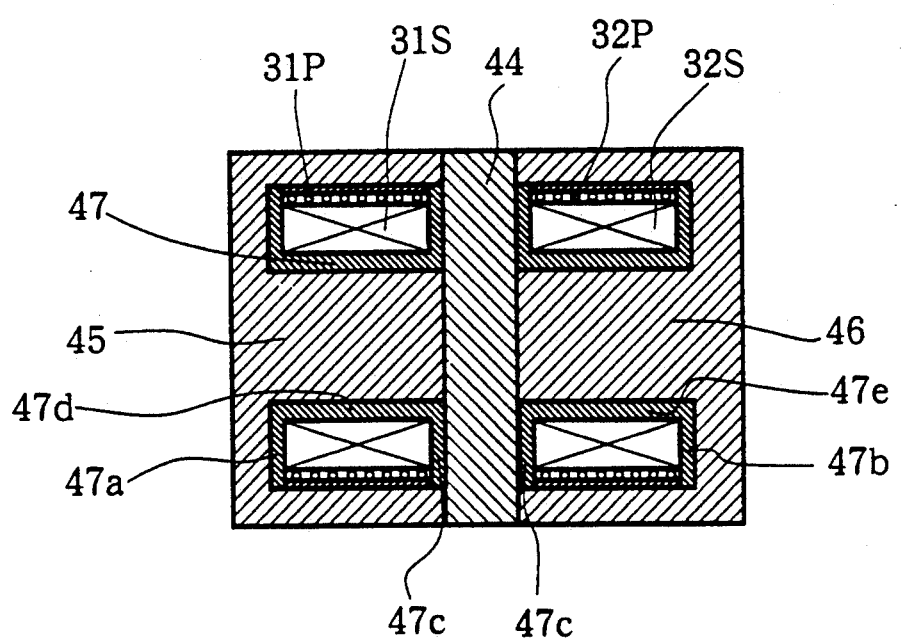
FIG. 4 is a sectional view taken along a line C—C in FIG. 2.

FIG. 2 is an axial sectional view exemplary showing such booster transformer 50, FIG. 3 is a bottom view of said transformer 50 and FIG. 4 is a sectional view taken along a line C—C in FIG. 2.

As will be apparent from FIG. 4, the transformer 50 includes a bobbin 47, an I-shaped ferrite core 44 and a pair of E-shaped ferrite cores 45, 46 sandwiching said core 44, these cores being assembled on said bobbin 47. The bobbin 47 has opposite end flanges 47a, 47b, an intermediate flange 47c, and first and second coil carrying sections 47d, 47e.

The first primary coil 31P and the first secondary coil 31S are wound on the first coil carrying section 47d while the second primary coil 32P and the second secondary coil 32S are wound on the second coil carrying section 47e of the bobbin 47.

In this booster transformer 50, as seen in FIG. 3, terminal pins 51a, 51b on which the primary coils 31P, 32P are fixed and the terminal pins 52a, 53a on which the low voltage side ends of the respective secondary coils 31S, 32S are fixed are planted on the intermediate flange 47c. A terminal pin 52b on which the high voltage (positive voltage) side end of the first secondary coil 31S is fixed is planted on the end flange 47a and a terminal pin 53b on which the high voltage (negative voltage) side end is fixed is planted on the end flange 47b.

With the booster transformer 50 of such construction, the counter electromotive force voltage generated across each of the secondary coils 31S, 32S is reduced by half, as previously mentioned, so that the thickness of the bobbin can be sufficiently reduced for miniaturization and thereby the small sized booster transformer of flat configuration can be obtained.

Additionally, an inter-terminal-pin leak accident which has conventionally occurred can be reliably avoided, since the group of terminal pins 51a, 51b, 52a, 53a on the low voltage side and the group of terminal pins 52b, 53b on the high voltage side are provided at the interflange distance.

Figure 5:
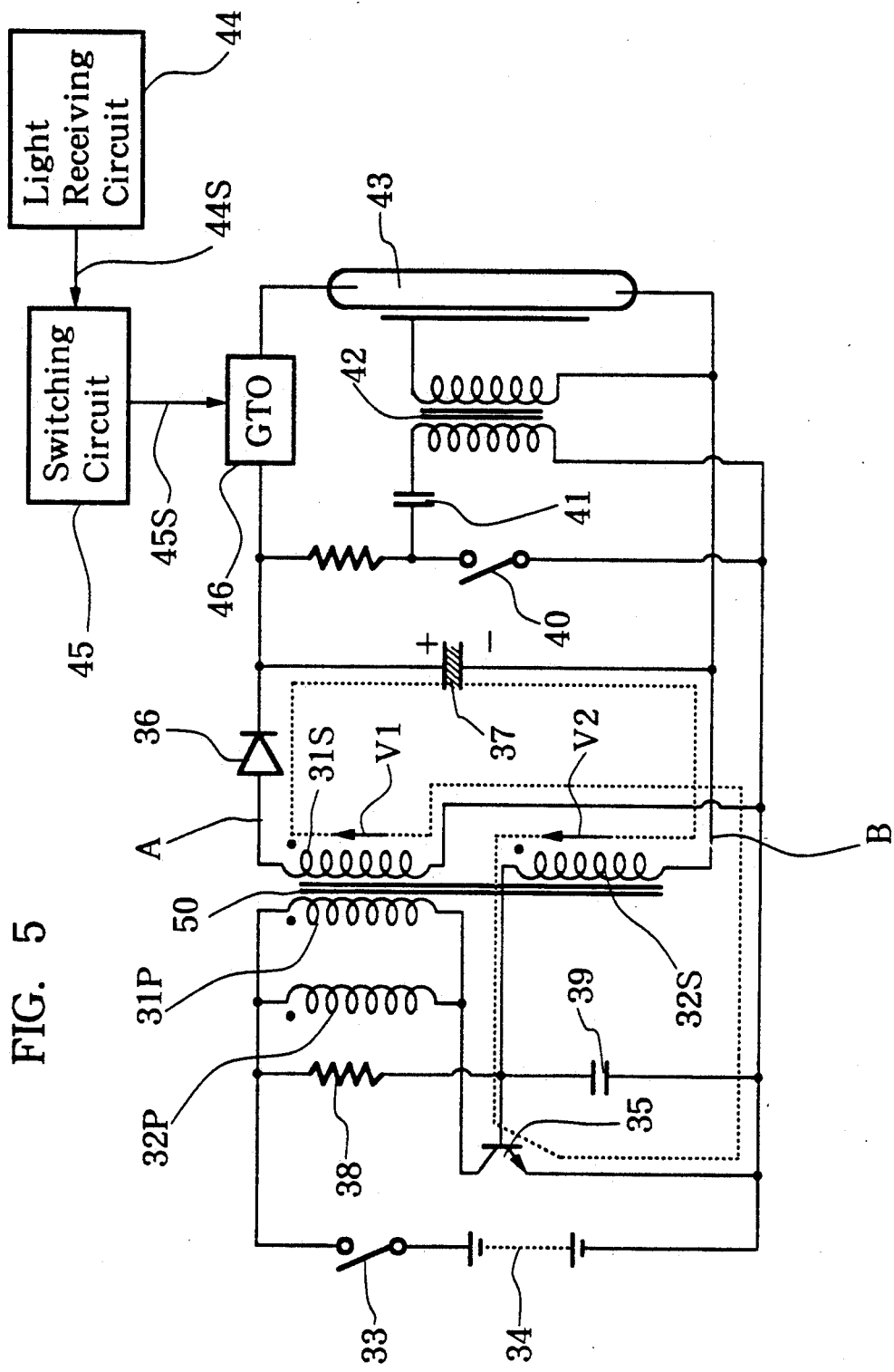
FIG. 5 is a circuit diagram of the photoflash discharge lamp having a light control function.
Figure 6:
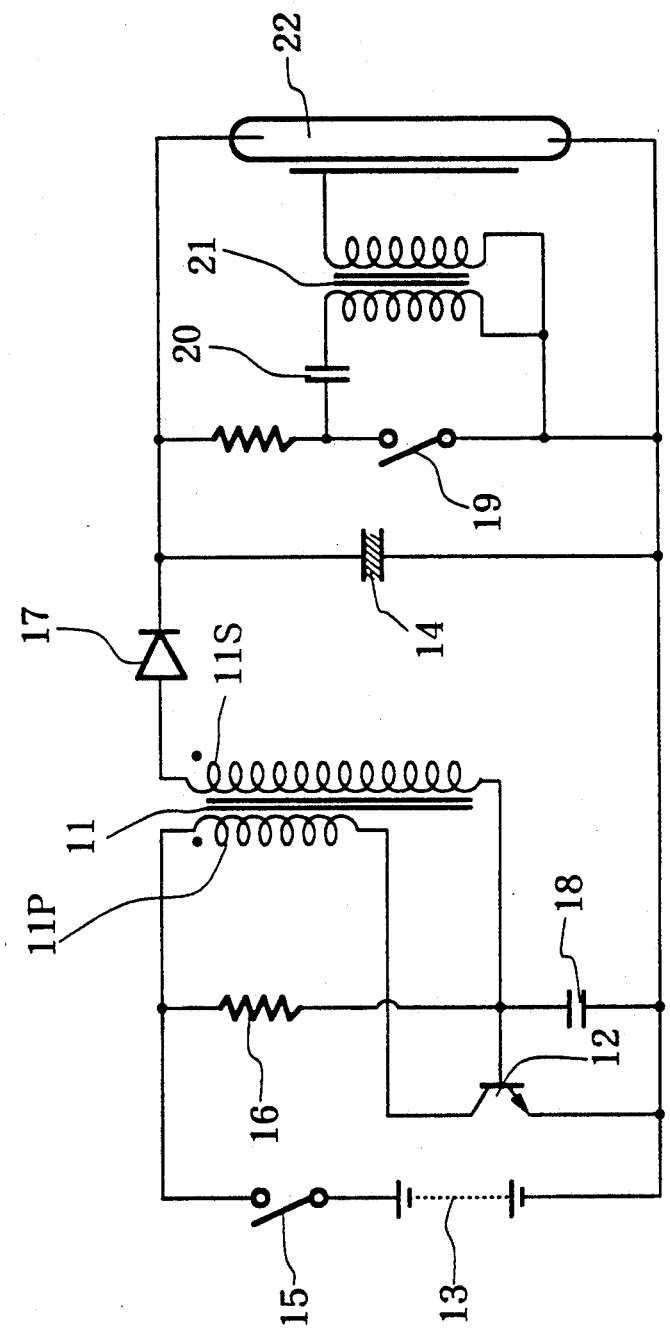
FIG. 6 is a circuit diagram of the photoflash discharge lamp provided with the conventional converter.

Referring to FIG. 5, there is shown a variant in which the photoflash discharge lamp circuit of FIG. 1 is provided with a light control function.

A photosensor 44 includes a photodetector element and an integrator so that the photodetector is responsive to the light emitted from the flash discharge tube 43 and reflected on an object to be photographed to output a photodetection signal which is, in turn, integrated by the integrator. When the integral value reaches a predetermined level, the integrator outputs a light control signal 44S.

In response to the light control signal 44S, a switching circuit 45 is transferred from a first state to a second state and outputs a gate signal 45S with which a GTO (Gate Turn-Off SCR) 46 is changed over from its turned on state to its turned off state.

The GTO 46 remains turned on until the gate signal 45S is applied thereto and, upon closure of the trigger switch 40, the flash discharge tube 43 discharges the main capacitor 37 and thereby emits the light.

Depending on a quantity of light reflected on the object to be photographed, the GTO 46 is turned off with the gate signal 45S and stops the light emission of the flash discharge tube 43.

More specifically, a duration of light emission from the flash discharge tube 43 depends on a distance to the object to be photographed so that the object may be illuminated with a predetermined quantity of light While the invention has been described in connection with the specific embodiment, it is not critical to set the output voltages V1, V2 to a same voltage value (absolute value) and the number of turns of respective secondary coils may be different from each other. In addition, it is also possible to connect the primary coils 31P, 32P in series or to employ a single primary coil.

Furthermore, the booster transformer 50 used for the invention is not limited to that employing EIE-shaped ferrite core but may be the transformer employing the ferrite core of the other configuration such as EE-shaped or EI-shaped ferrite core.

Finally, the invention is applicable as the converter used in various electric apparatus circuits other than the photoflash discharge lamp circuit as has been described and illustrated above as the presently preferred embodiment.

What is claimed is:

1. A converter including a booster transformer having a primary coil and a switching element adapted for make and break of a primary coil current through the primary coil of said booster transformer so that voltage of a DC source supplying said primary coil current is boosted by an output from the converter, characterized in that the booster transformer has a first secondary coil having a first end, said first secondary coil generating a positive voltage at said first end in reference with zero potential every time the primary coil current flows; and a second secondary coil having a first end, said second secondary coil generating negative voltage at said first end also in reference with the zero potential, so that a voltage corresponding to the sum of the positive voltage generated across the first secondary coil and the negative voltage generated across the second secondary coil is output between the first ends of the first and second secondary coils, wherein, in said booster transformer, the primary coil has one end connected to a positive terminal side of the DC source and the other end connected to a negative terminal side of said DC source via a collector-emitter path of a switching transistor; the first end of the first secondary coil is connected to a diode so as to serve as a positive voltage output end and the first secondary coil has a second end connected to the negative terminal side of the DC source; and the second secondary coil has a second end connected to the negative terminal side of the DC source via a base-emitter path of said transistor and the first end of the second secondary coil serves as a negative voltage output end.

2. A converter as recited in claim 1, further comprising a main capacitor connected between the first and second secondary coils of the booster transformer to form a source circuit for a flash discharge lamp.

3. A converter including a booster transformer having a primary coil and a switching element adapted for make and break of a primary coil current through the primary coil of said booster transformer so that voltage of a DC source supplying said primary coil current is boosted by an output from the converter, characterized in that the booster transformer has a first secondary coil having a first end, said first secondary coil generating a positive voltage at said first end in reference with zero potential every time the primary coil current flows; and a second secondary coil having a first end, said second secondary coil generating negative voltage at said first end also in reference with the zero potential, so that a voltage corresponding to the sum of the positive voltage generated across the first secondary coil and the negative voltage generated across the second secondary coil is output between the first ends of the first and second secondary coils, wherein the booster transformer is provided with first and second primary coils so that the current flowing through the first primary coil generates positive voltage across the first secondary coil and the current flowing through the second primary coil generates negative voltage across the second secondary coil.

4. A converter as recited in claim 3, wherein the booster transformer comprises a bobbin having first and second coil carrying sections divided by a flange and core assembled on this bobbin so that the first primary and secondary coils are wound on said first coil carrying section while the second primary and secondary coils are wound on said second coil carrying section of the bobbin.

* * * * *